United States Patent Office 3,116,583
Patented Jan. 7, 1964

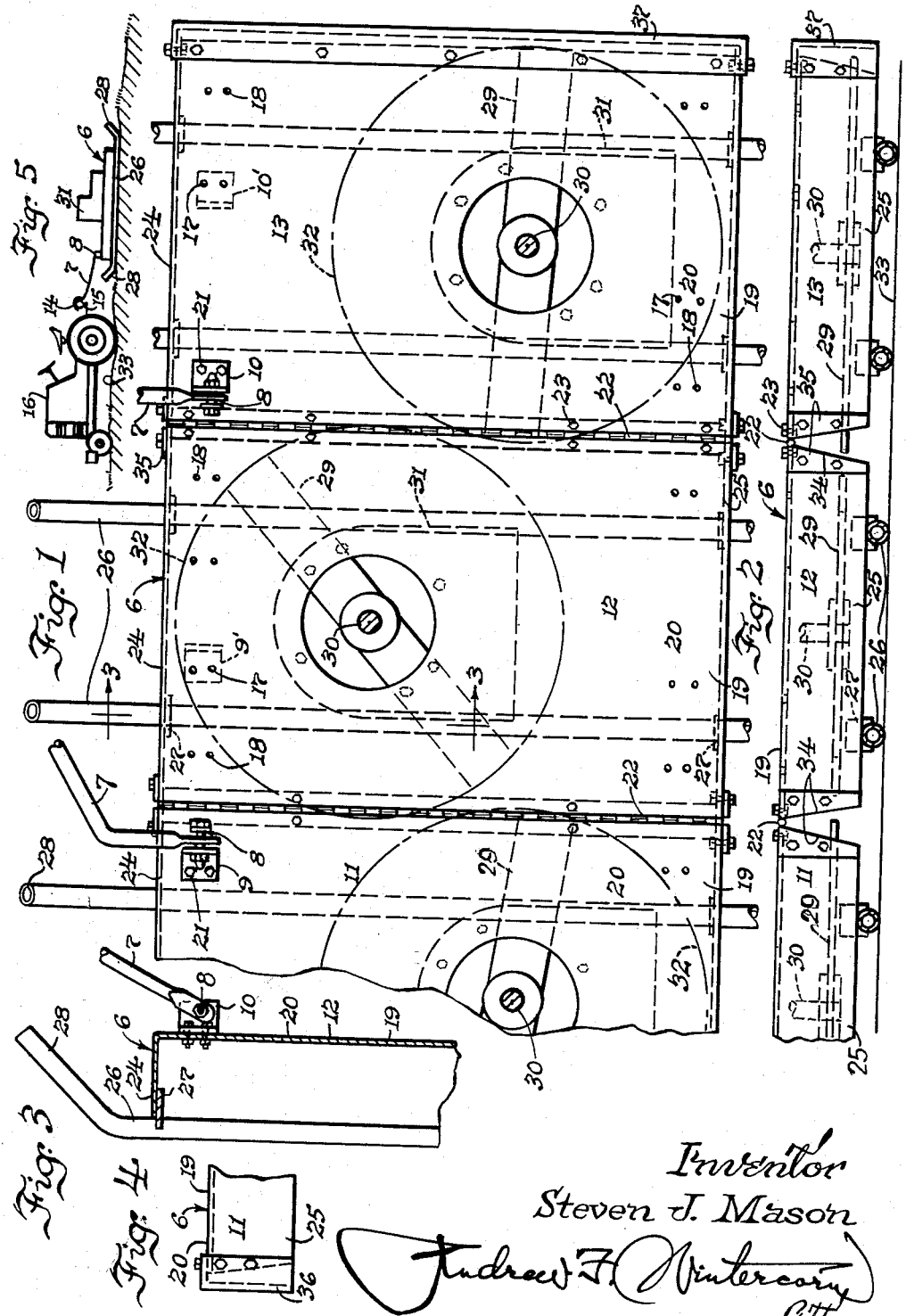

3,116,583
GANG ROTARY MOWER
Steven J. Mason, R.R. 1, The Ledges, Roscoe, Ill.
Filed July 5, 1960, Ser. No. 40,868
6 Claims. (Cl. 56—6)

This invention relates to gang rotary mowers, all of the separately powered units of which are slidably mounted separately on pairs of parallel skis or skids for best operation as a group, but hingedly connected together alongside one another with their motors disposed in zig-zag staggered relationship and with the rotary blades in neighboring units cutting overlapping swaths in approximately the same plane so that no gaps of uncut grass will be left standing as the gang is drawn forwardly over the terrain, while the hinging of the units relative to one another insures conforming the variously angled planes of cutting nicely to the indulations of the terrain, and the skis on the individual units eliminate any likelihood of scalping any areas in the mowing operation.

The skids or skis provided in accordance with my invention are of light tubular construction for easy draft and are of sufficient sectional diameter and sufficient length and are most advantageously spaced laterally of each unit and relative to the rotary blade to insure smooth mowing and also to best distribute the load and thereby further reduce draft and also reduce likelihood of making ruts in the turf, the combination of a plurality of hingedly connected units in side by side relationship running on skis that determine the changing angles of planes of cutting for the several units instantaneously relative to one another as a gang insuring overall smoother mowing and freedom from the steps noticeable otherwise with reel type gang mowers where the neighboring mowers generally rise and fall more or less independently of one another.

The invention is illustrated in the accompanying drawing, in which—

FIG. 1 is a plan view of a three-unit gang rotary mower made in accordance with my invention, although there may be as few as two units, and as many as five units, similarly arranged, a five-unit gang merely adding another unit at each end of the present three-mower assembly, leaving the draft yoke where it is shown, but a two-unit or a four-unit mower assembly requiring shifting of the draft yoke to the right of the position shown to where the clips for the yoke are indicated in dotted lines;

FIG. 2 is a rear view of FIG. 1;

FIG. 3 is a sectional detail on line 3—3 of FIG. 1;

FIG. 4 is a rear view of the left hand end of FIG. 1, showing the other side closure plate, and FIG. 5 is a small scale side view of the gang mower in use, showing its universal ball and socket coupling connection with a tractor.

The same reference numerals are applied to corresponding parts in these five views.

Referring to the drawing, the reference numeral 6 designates a three-unit gang mower, made in accordance with my invention, having a draft yoke 7 pivotally connected therewith on a horizontal axis, as indicated at 8 by means of clips 9 and 10, mounted on units 11 and 13 on opposite sides of the middle unit 12, the yoke 7 having a socket 14 on its front end in which a ball head 15 is universally pivotally engaged for detachably connecting the gang mower 6 with a tractor 16 to be pulled thereby. While I have shown a three-unit gang mower, it should be understood that the invention is applicable also to other mowers having as few as two units or as many as five or even more units. In the case of a two or four-unit gang mower the clips 9 and 10 would be shifted to the positions indicated in FIG. 1 at 9' and 10' where bolt holes 17 are provided, in addition to the bolt holes 18 located closer to the lateral edges of the top walls 19 of the elongated rectangular housing 20 of the various units, holes 18 being used to receive the bolts 21 to fasten the clips 9 and 10 to the right hand edge portion of unit 11 and left hand edge portion of unit 13, as shown. Obviously, a two-unit mower can have units added to the right and left hand ends thereof to make a four-unit mower, and likewise, the three-unit mower shown could have units added to the left and right hand ends thereof to make a five-unit mower.

The adjoining units in all cases are hingedly connected by piano type hinges 22 suitably secured to the top walls 19 as by means of bolts 23. Each unit has downwardly projecting front and rear walls 24 and 25 suitably integral with the top walls 19, and each unit has two parallel skids or skis 26 for slidably supporting the same suitably secured to the lower edges of the front and rear walls 24 and 25, as indicated at 27. The front and rear ends of these skis are bent upwardly, as indicated at 28 in FIGS. 3 and 5, to ride over obstacles like a sled runner. Each unit also has a rotary cutter blade 29 turning with a vertical shaft 30, and a small gasoline engine for driving the same is carried on top of the unit, as indicated at 31, these engines and their blades in neighboring units being staggered or offset with relation to one another so that the circles 32 swept out by the blades 29 will not overlap, although the swaths cut by these blades will overlap enough to eliminate the likelihood of any gaps being left of uncut grass as the gang mower is drawn forwardly over the terrain. The hinging of the units relative to one another at 22 insures conforming the variously angled planes of cutting nicely to the undulations of the terrain, while the skis on the individual units serve to eliminate any likelihood of scalping any areas in the mowing operation, each pair of skis being disposed spaced below and parallel to the blade 29, laterally spaced from the vertical blade axis about half the radius dimension of the blade, as seen in FIGS. 1 and 2. In operating on a smooth flat surface 33 all of the blades 29 will, of course, operate in substantially the same horizontal plane, as appears in FIG. 2. The skis 26 are of light tubular construction and of sufficient length and are furthermore most advantageously spaced for best distribution of the load so as to prevent grooving the turf, this combination also serving to reduce draft, so that a tractor does not use nearly as much gasoline to mow a given area as was required with other mowers, particularly the reel type. The front and rear walls 24 and 25 are cut away at their ends, as indicated at 34 in FIG. 2, to avoid interference with the hinging of the units with respect to one another as they follow the profile of the terrain in the forward travel of the mower, and it must be evident that since each pair of skis determines the angle of cutting for a given unit, and as these angles change repeatedly as the mower moves forward, due to difference in contour or profile of the terrain, a much smoother mowing job results due to the fact that the units all work together in their hinging action, and consequently there will be no steps noticeable in the mowed grass, which were otherwise inevitable with reel-type gang mowers, where the neighboring units generally were free to rise and fall more or less independently of one another in their forward movement. Reinforcing plates 35 are bolted to the upwardly converging lateral edge portions of the front and back walls at 34, and side enclosing plates 36 and 37 are bolted to outer side of the end units 11 and 13, respectively, to complete the enclosure of the cutting blades 29 for safer operation of the mower.

The operation of the present improved gang rotary mower is believed to be clear from the foregoing description. Aside from the forward location of the engine 31 and its associated blade 29 in the middle unit 12, in relation to the rearward disposition of the engine 31 and blade 29 on units 11 and 13, the units are alike and interchangeable. Actually, the housings 20 are interchangeable, as indicated by the fact that a duplicate set of holes 17 and 18 is provided at the rear end on each unit, as appears in FIG. 1, so that the only change necessary is the reversal of the skis 26 to make units 11 and 13 the same as unit 12, or vice versa, but even that little difference is unnecessary if the skis 26 have their front and rear ends extended and bent upwardly alike, as at 28. This interchangeability results in a considerable saving in the cost of manufacture and is a big advantage in the merchandising of the product because it cuts down the number of different parts required to a minimum.

It is believed the foregoing description conveys a good understanding of the objects and advantages of my invention. The appended claims have been drawn to cover all legitimate modifications and adaptations.

I claim:

1. A gang mower having at least three laterally arranged units hinged together along their adjacent edge portions, a rotary type cutter below each unit and having a shaft extending vertically upwardly therethrough for connection with drive means, said shafts being in staggered relationship to a line drawn transversely of said units, each of said units having a front and a rear downwardly projecting wall, and at least two intermediately arranged longitudinally extending parallel skids attached to the lower edge portion of said front and rear walls of each of said units for slidable support thereof.

2. A gang mower as set forth in claim 1, wherein all of the units are approximately of the same length and same width, narrow in relation to length and disposed with their downwardly projecting walls in transverse alignment at their front and rear ends, and wherein all of their rotary type cutters cut circular swaths of approximately the same diameter that are large enough in relation to the width of the units so that with the cutters located on the longitudinal center lines of the housings the circles of these circular swaths would overlap if the cutters were disposed on a transverse line abreast of one another, the staggered arrangement of the shafts for said cutters being such that these circles are in closely spaced relation to one another.

3. A gang mower as set forth in claim 1, wherein the two longitudinally extending skids for each unit are spaced alike on opposite sides of the shaft a distance less than the radius of the rotary type cutter, and in a horizontal plane spaced a predetermined distance below the horizontal plane of operation of the rotary type cutter.

4. A gang mower as set forth in claim 1, wherein the two longitudinally extending skids for each unit are spaced alike on opposite sides of the shaft a distance less than the radius of the rotary type cutter, and in a horizontal plane spaced a predetermined distance below the horizontal plane of operation of the rotary type cutter, the skids being longer than the unit and disposed with at least the front end portions thereof projecting forwardly from the unit and having upwardly directed extremities.

5. A gang mower as set forth in claim 1, including a draft yoke disposed on the longitudinal center line of the middle one of the three units and pivotally connected at its rear ends to the outer two units at their front ends in closely spaced relation to their hinge connections with the middle unit.

6. A gang mower as set forth in claim 1, wherein the skids are of light tubular construction and round in cross-section so as to have substantially line contact with the ground, at least the forward end of each skid being upwardly directed for a sled runner effect.

References Cited in the file of this patent
UNITED STATES PATENTS

| 2,743,567 | Martin | May 1, 1956 |
| 2,920,434 | Ingram | Jan. 12, 1960 |
| 2,952,961 | Engler | Sept. 20, 1960 |